Figure 1:
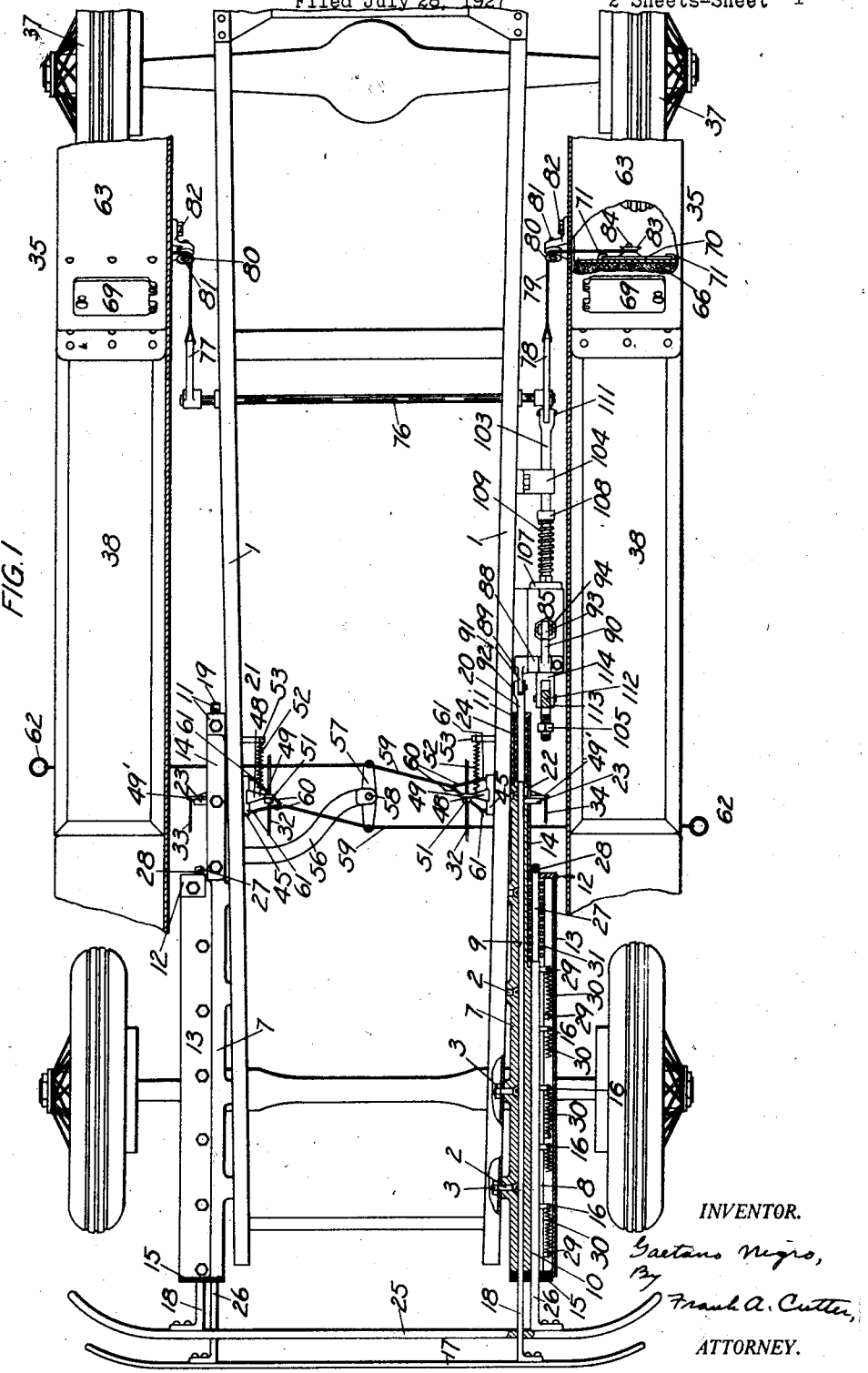

Feb. 19, 1929.　　　　　　　　　　　　　　　　　　1,702,744
G. NIGRO
BUMPER FOR AUTOMOBILES
Filed July 28, 1927　　　2 Sheets-Sheet 1

INVENTOR.
Gaetano Nigro,
By Frank A. Cutter,
ATTORNEY.

Feb. 19, 1929.
G. NIGRO
1,702,744
BUMPER FOR AUTOMOBILES
Filed July 28, 1927   2 Sheets-Sheet 2
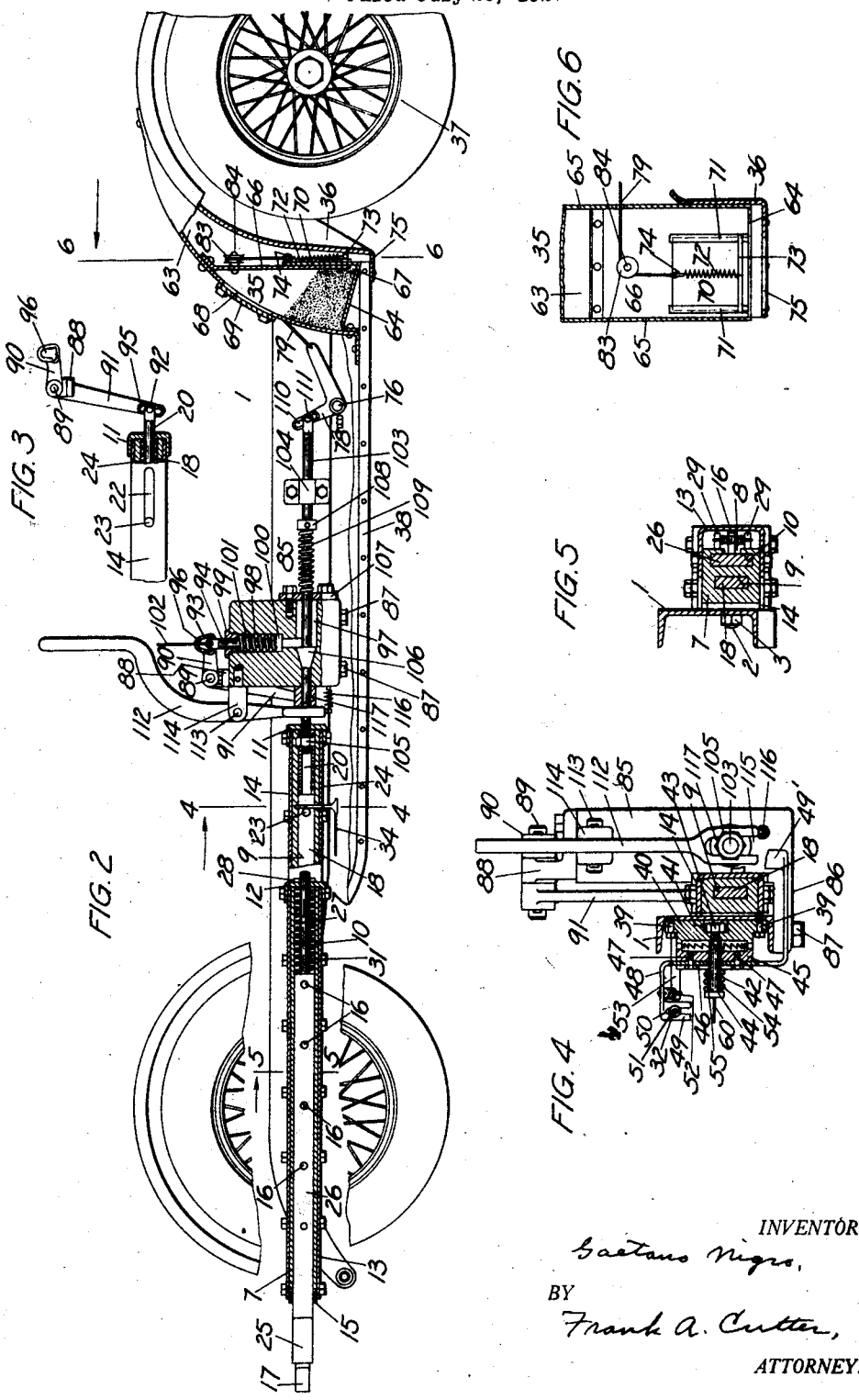
INVENTOR.
Gaetano Nigro,
BY
Frank A. Cutter,
ATTORNEY.

Patented Feb. 19, 1929.

1,702,744

UNITED STATES PATENT OFFICE.

GAETANO NIGRO, OF THOMPSONVILLE, CONNECTICUT.

BUMPER FOR AUTOMOBILES.

Application filed July 28, 1927. Serial No. 209,149.

My invention relates to improvements in appliances applicable to automobiles for the purpose of receiving impacts and protecting other parts of the machines from the force thereof, in the event of head-on collisions, and consists generally of a duplex bumper, or a bumper comprising primary and secondary, yielding or spring-pressed elements, slidingly arranged in casings rigidly attached to the chassis of an automobile, and safety mechanisms or devices for setting the brakes of the machine, and cutting out the ignition and shutting off the fuel supply from the engine, and also for releasing sand in front of the rear wheels of said machine which devices have operating parts capable of being actuated by said primary element, and include or have associated therewith resetting means, the sanding devices being capable of operation by hand as well as by said primary element, together with such other parts and members as may be necessary or desirable in order to render the bumper complete and serviceable in every respect, all as hereinafter set forth.

This invention is in the nature of an improvement of the bumper covered by Letters Patent of the United States No. 1,621,997, issued to me March 22, 1927.

The safety devices mentioned above may be omitted without affecting in any way the efficiency of the duplex bumper as an impact-receiving element; nevertheless, I prefer to add said devices and thereby utilize certain inherent characteristics of the action of the one of the bumper elements, which otherwise would be lost or wasted, to the end that a much greater degree of safety and security or protection is obtained from damage and danger.

A single yielding bumper element is open to objection, for the reason that the springs therefor are of sufficient strength to withstand a severe shock, and so strong as not to yield under a light shock, on the one hand, and, if weak enough to yield when the bumper element is subjected to a comparatively light impact, are not strong enough to afford protection when the impact is heavy, on the other hand. One object of my invention is, therefore, to overcome these difficulties, and produce a bumper which is effective and efficient under any and all kinds of shocks and impacts, thus preventing breakage and damage or reducing them to a minimum, and absorbing in great measure, if not entirely, the shock and jar of collision.

Another object is to provide, in connection with such a bumper, means for automatically setting the brakes and stopping the engine of the automobile, in the event an object is struck by the primary bumper element and the force of the blow actuates said element rearwardly.

A further object is to provide, in connection with a bumper of the class described, means for automatically discharging sand onto the ground in front of the rear wheels of the vehicle, so that said wheels are prevented from slipping or sliding on the road when the brakes are set, and to provide such means as can be operated by hand, if desired or necessary.

Still another object is to furnish adequate means for resetting the safety devices, after they have been operated by the primary bumper element, the resetting means for the brake-, ignition-, and fuel-operating devices preferably being so arranged and located as to necessitate the driver leaving the car in order to actuate said resetting means, because an additional element of safety is thus added, and incidentally tends to prevent him from leaving the scene of an accident before the number of his machine can be taken and his name obtained.

My appliance is comparatively simple and inexpensive, and can readily be attached to the chassis of an automobile.

Other objects and advantages will appear in the course of the following description.

I attain the objects and secure the advantages of my invention by the means illustrated in the accompanying drawings, in which—

Figure 1 is a top plan, with parts broken away and in section, of an appliance which embodies a practical form of my invention, and of a chassis and other parts of an automobile to which said appliance is attached and with which the same is associated; Fig. 2, a longitudinal, vertical section through the parts and members of said appliance on one side; Fig. 3, a detail in side elevation of parts of the sanding mechanism; Fig. 4, an enlarged, cross section through one of the clutch mechanisms and associated parts, with other parts in elevation, taken on lines 4—4, looking in the direction of the associated arrow, in Fig. 2; Fig. 5, an enlarged, cross section through the left-hand bumper members, taken on lines 5—5, looking in the direction of the associated arrow, in Fig. 2, and, Fig. 6, a cross section through the sand box on the left-hand side of the machine, taken on lines 6—6 looking in the direction of the associated arrow, in Fig. 2.

Similar reference characters designate similar parts throughout the several views.

At 1—1 are shown the side beams of an automobile chassis, which beams, in the present example, consist of channel-irons arranged with their flanges on adjacent sides.

Secured against the outer side of each beam 1 by any suitable means, such as bolts 2 and nuts 3, is a casing 7 comprising longer and shorter parts, the shorter part being on the outer side. In the outer side of the aforesaid short part of the casing 7, in the longitudinal center, is a slot 8. Longitudinal passages 9 and 10 extend through the casing 7, the passage 9 being in the longer part and the passage 10 in the shorter part thereof. A perforated cap 11 is secured over the rear end of the longer part, and a perforated cap 12 is secured over the rear end of the shorter part, of the casing. Mounted on and secured to the shorter part of the casing, over the slot 8 therein, is a housing 13, and mounted on and secured to that portion of said casing which extends back of said shorter portion, on the outer side thereof, is a housing 14. The cap 11 closes the rear ends of the longer part of the casing 7 and the housing 14, and the cap 12 closes the rear ends of the shorter part of said casing and the housing 13. The front end of the casing 7 and housing 13 are closed by means of a perforated cap-plate 15 which is preferably made of rubber. The cap-plate 15 is suitably secured to the casing and housing. Projecting from the outer side of the shorter part of the casing 7, alternately above and below the slot 8 therein, are pins 16.

A cross-bar 17 is rigidly attached to the front ends of two plungers 18 which are slidingly arranged in the inner, longer passages 9 in the casings 7, such plungers passing through the two of the perforations in the cap-plates 15 at the forward ends of said casings, and having projections or tail-pieces 19 and 20, respectively, at their rear terminals. The tail-pieces 19 and 20 extend through the perforations in the caps 11. The tail-piece 19, which is on the right-hand side of the chassis, may have a transverse pin 21 passed therethrough, behind the cap 11 on that side, to contact with said cap and thereby limit the forward movement of the right-hand plunger 18. There are longitudinal slots 22 in the outer sides of the housings 14, and pins 23 extend outwardly from the plungers 18 through said slots. The pins 23, in contacting with the front ends of the slots 22, limit forward or outward movement of both plungers 18. The pin 21 must, of course, encounter the right-hand cap 11 at the same time the pins 23 encounter the forward ends of the slots 22. A spiral spring 24 encircles each of the tail-pieces 19 and 20, between one of the caps 11 and the shoulder at the junction between the tail-piece and its plunger 18, and these springs normally retain both plungers with the cross-bar 17 in advanced position.

The spring pressed plungers 18, with their cross-bar 17, make up the primary yielding bumper element. The secondary, yielding, bumper element comprises a cross-bar 25 and two spring-pressed plungers 26 outside of the plungers 18.

The plungers 26 are slidingly arranged in the outer, shorter passages 10 in the casings 7, extend through the outer two perforations in the cap-plates 15, and have projections or tail-pieces 27 at their rear terminals that extend through the perforations in the caps 12. Transverse pins 28 in the tail-pieces 27, behind the caps 12, contact with said caps and limit the forward movement of the plungers 26. The cross-bar 25 is perforated to enable the plungers 18 to pass through said cross-bar. Thus it is seen that the primary yielding element can be moved independently of the secondary yielding element, except when both cross-bars are in contact with each other. Normally the cross-bar 17 is positioned by the springs 24 and the pins 21 and 23 some distance in advance of the cross-bar 25. Projecting forwardly from the outer side of each plunger 26 and extending through the slot 8 in its casing 7 are pins 29. Each pin 29 is adjacent to one of the pins 16. On each side of the appliance opposite ends of a spiral spring 30 are attached to each pin 16 and the next adjacent pin 29, respectively. A spiral spring 31 encircles each tail-piece 27 within the housing 13 in which said tail-piece is located, between the cap 12 on said housing and a shoulder at the junction of said tail-piece with its plunger 26.

Normally the springs 30 are in contracted and the springs 31 in expanded conditions, and the plungers 26 are held in their forward position and with the cross-bar 25 some distance from the cap-plates 15, but spaced inwardly from the cross-bar 17, by said springs, the outward movement of said plungers being limited by pins 28.

When force is applied to the cross-bar 17 sufficient to overcome the resistance of the springs 24, the plungers 18 are actuated rearwardly in the casings 7, and, if the movement of said cross-bar be sufficient for and the force great enough to cause said cross-bar to encounter the cross-bar 25 and overcome the resistance of the springs 30 and 31, the plungers 26 are actuated rearwardly in said casings as far as the aforesaid springs permit, or until said second-named cross-bar is checked by the cap-plates 15. As the plungers 26 move in their casings 7 the pins 16 travel in the slots 8. Naturally the resistance of the springs increases as the plungers 18 and 26 continue to move inwardly or rearwardly.

It is now clear that this duplex bumper, consisting as it does of primary and secondary yielding elements, is well adapted to take care of almost any impact which it receives, and to absorb the force of the same, so that the vehicle equipped with said bumper is protected from serious damage.

This duplex bumper may be applied to the rear as well as to the front of an automobile, either or both.

In order to utilize my duplex bumper as a medium for setting the vehicle brakes and stopping the engine, and for discharging sand onto the ground in front of the rear wheels of said vehicle, at the time the primary yielding element of said bumper is operated, I provide safety mechanisms or devices to cooperate with or to be operated by the pins 23 and the tail-pieces 19 and 20. By employing the safety devices in pairs the liability or possibility even of failure to stop the machine almost upon the instant the primary yielding element is forced rearwardly, by front-end collision, is reduced to the minimum.

At 32—32 are brake rods which are connected with the brakes (not shown) of the machine, and adapted when moved forwardly to set said brakes; at 33 and 34, respectively, are represented wires which are connected one with the ignition switch (not shown) and the other with the fuel-supply valve (not shown) by means of which the engine is controlled, and adapted when actuated rearwardly to throw said switch and operate said valve to stop said engine; and at 35—35 are represented sand boxes, consisting in part of the portions of the fenders 36 over the two rear wheels (indicated by the numeral 37) of the vehicle, and partially supported by the running-boards 38 on both sides of said vehicle.

I will next describe in detail one of the two clutch mechanisms, which mechanisms are elements of the safety devices, and both are alike.

Secured by bolts 39, or other means, to the inner face of the vertical part of each beam 1 is a clutch member 40. In the center of the clutch member 40 is a recess 41 which opens next to the vertical part of the beam 1, and also opens into an axial bore in said member for a screw-threaded pin 42. There is a nut 43 in the recess 41, and the pin 42, after being passed through the bore in the clutch member 40, is screwed into said nut, and is thereby prevented from being withdrawn from said member. The pin 42 has a shoulder to bear against the outer rim of the central bore in the clutch member 40, as shown in Fig. 4, so that said pin, when tightened in the nut 43, is rigidly secured to said clutch member, and held against rotation therein. The pin 42 has a head 44 at the end opposite that whereon the nut 43 is located. Loosely mounted on the pin 42 inside of the fixed clutch member 40 is a clutch member 45. These clutch members have on adjacent sides interengaging teeth. The clutch member 45 has a slot 46 in and extending across the entire diameter of the exposed face thereof, and received in said slot and secured to said member, by means of bolts 47, is an operating bar 48. The pin 42 extends through the bar 48. The bar 48 normally stands upright, and at its upper end extends inwardly and then downwardly to form a lug 49 in which is a vertical slot 50 to receive one of the brake rods 32. Secured to the brake rod 32 directly in front of the lug 49 is a collar 51. Obviously, when the bar 48 is rocked on the pin 42 in the direction to swing the lug 49 forwardly, the collar 51 must be carried with said lug and take with it the brake rod 32 on which said collar is mounted. The bar 48 at the bottom extends outwardly and then upwardly to form a lug 49' which is directly behind the pin 23 in the adjacent plungers 18. The lug 49' is retained in contact with the pin 23, and said lug and the bar 48 with the lug 49 are maintained normally in an approximately vertical position, by means of a spiral spring 52 that has one end attached to said bar near the lug 49 and the other end attached to a pin 53 that projects inwardly from the adjacent beam 1, behind said bar.

The wires 33 and 34 have their rear terminals attached to the bars 48 below the pins 42, and said wires are drawn rearwardly when said bar is rocked by the plungers 18 through the medium of the pins 23.

A spring 54 is interposed between the head 44 and a washer 55 mounted on the pin 42 and spanning the slot 46, and tends to force the movable clutch member 45, laterally on said pin toward the fixed clutch member 40, and to retain the clutch-member teeth in engagement with each other.

Supported from the chassis, as by a bracket 56 that extends inwardly from one of the beams 1 into the center of the space between the two pairs of clutch members, is an arm 57. The arm 57 is pivotally connected in the center, as at 58, with the inner end of the bracket 56. A draw or pull cord or wire 59, having terminals 60 which are attached to one of the movable clutch members 45 in front of and behind the pin 42 on which said member is mounted, at points indicated by the numeral 61, extends inwardly to one terminal of the arm 57 where said wire is made fast, and then the cord continues outwardly beneath one of the running-boards 38, a ring 62 being attached to the outermost end of said cord. There are two of these wires, and they are attached to opposite ends of the arm 57, and have branches at their inner terminals attached to the two movable clutch members 45, pass outwardly under the running-boards 38, and are equipped at their inner ends with rings 62. Consequently, if either of the wires 59 be pulled outwardly by means of its ring 62, the clutch member 45 with which said wire is directly connected is drawn inwardly on its pin 42, against the resiliency of its spring 54, and can thus be moved to disengage the teeth on said member from the teeth on the associated fixed clutch member 40, and at the same time the other movable clutch member is actuated by the other wire 59 to disengage the teeth on said second-named movable clutch member from the teeth on the associated fixed clutch member. The second clutch member 45 is indirectly actuated by the wire 59 pulled by the operator, through the medium of the arm 57, to which both pull wires are attached, and the second wire, the latter being caused to exert a pull in the opposite direction and carry with it said second clutch member.

After the bars 48 have been actuated by the plunger pins 23 to set the brakes and stop the engine, operations which will presently be more fully explained, said bars must be reset, and this work is done by pulling either of the wires 59 outwardly and in the manner just explained. It will be noted that the rings 62 are accessible only from the ground, usually, therefore, the operator must leave the car before he can start it again, after the cross-bar 17 has received an impact that forces the same and the plungers 18 inwardly far enough to cause the safety devices to operate.

Upon the rearward movement of the plungers 18 the pins 23 in the plunger tailpieces 19 and 20, which pins are in front of the lugs 49', force said lug rearwardly, and thus cause the bars 48 to rock on their pins 42 and carry forward the lugs 49, against the resiliency of the springs 55, with the result that the brake rods 32 are operated to set the brakes, and the wires 33 and 34 are operated to stop the engine. When the bars 48 are rocked on the pins 42 in the manner just explained, they carry with them the clutch members 45, and, owing to the relative arrangement of the clutch-member teeth, and the fact that the clutch members 40 are held against rotation, said first-named clutch members are forced inwardly on said pins, against the resiliency of the springs 54, the teeth of the movable clutch members then riding over the teeth of the fixed clutch members. The slots 50 in the lugs 49 are large enough to permit the bars 48 to move inwardly and outwardly, with the clutch members 45, without interference from the brake rods 32.

At the end of the operations just described, the bars 48 are disposed obliquely and held in such position by the now intermeshing clutch-member teeth, and it is necessary to reset said bars, or to restore them to an approximately upright position. To reset the bars 48, one of the wires 59 is drawn outwardly, with the result that both clutch members 45 are actuated inwardly until the two sets of clutch-member teeth clear each other, when the springs 55 cause the bars 48 and the clutch members 45 to be partially rotated on the pins 42 in the opposite direction to that in which said bars and clutch members were partially rotated by the action of the inwardly moving plungers 18. When the bars 48 are once more erect and the lugs 49' strike the pins 23, it being assumed that the plungers 18 are now in their forward position, the wire 59 pulled by the operator is released. The springs 54 now force the clutch members 45 into locking engagement with the clutch members 40. The resetting of the safety devices releases the brake rods 32 and the engine-stopping wires 33 and 34 and enables them to resume their inactive positions, and said devices are left in readiness for a repetition of the operations previously described.

Each sand box comprises a portion of one of the fenders 36, an arcuate wall 63 which extends downwardly and forwardly from the top of said fender to the adjacent running-board 38, a floor 64 that inclines downwardly and rearwardly from said wall, side walls 65—65, and a vertical partition 66 that extends downwardly from said first-named wall to within a short distance from said floor adjacent to the rear edge thereof, a slot or opening 67 being left between said floor and the bottom edge of said partition. In the wall 63 is an opening 68 for the introduction of sand into the box 35, and a door 69 is provided for said opening. A slide 70 is arranged to move up and down in guide flanges 71—71 on the back side of the partition 66, and is normally held in closed position, with its bottom edge on the floor 64, by means of a spring 72 having its bottom end attached to a rod 73 that extends between and is fastened to said flanges, and its upper end attached to an eye-bolt 74 projecting from the back side of said slide near the upper end thereof. When normally disposed the slide closes the opening 67, but, upon raising said slide, against the resiliency of the spring 72, said opening is uncovered and the sand in the box 35 permitted to run out through this opening and through a slot or opening 75 in the bottom of the fender 36 back of the running-board 38, onto the ground in front of the wheel 37 behind. The inclination of the floor 64 facilitates the escape of the sand when the slide 70 is elevated.

The slides 70, for the two boxes 35, are raised to permit the sand to escape from said boxes, each time the plungers 18 are actuated rearwardly and the safety devices are operated by said plungers to set the brakes and stop the engine, through the medium of the mechanism described below.

A transverse rock shaft 76 is journaled in the beams 1, and secured to opposite terminals of said shaft outside of said beams are an arm 77 and a bell-crank-lever 78, respectively. The arm 77 and the long arm of the bell-crank-lever 78 extend upwardly and rearwardly from the shaft 76, and a cord 79 connects each of these members with one of the slides 70. Each cord 79 has one terminal attached to the arm 77 or the bell-crank-lever 78, as the case may be, extends rearwardly over an idler 80 mounted on a stud 81 carried by a bracket 82 secured to the inner side 65 of the associated box 35, outwardly over an idler 83 mounted on a stud 84 which projects rearwardly from the partition 66, and downwardly to have the opposite terminal attached to the eye-bolt 74.

Obviously, if the shaft 76 be rocked in the direction to carry the arm 77 and the long arm of the bell-crank-lever 78 downwardly, the slides 70 are raised in their guide flanges 71 and thus opened, against the resiliency of the springs 72, through the medium of the cords 79, and then, upon the release of said shaft, said springs act immediately to lower and thus close said slides.

A supported block 85 is secured to the beam 1 which is adjacent the bell-crank-lever 78, the left-hand beam in the present example, said block having an inwardly extending flanges 86 that is bolted at 87 to the under side of said beam. Mounted on and secured to the top of the block 85 is a bracket 88 in which is journaled a short, transverse, rock shaft 89. Rigidly secured to opposite terminals of the shaft 89 are arms 90 and 91, respectively, the former extending rearwardly, and the latter downwardly and forwardly to be pivotally connected at 92 with the rear end of the tail-piece 20. The arm 90 extends over the top of the block 85, and has pivotally connected therewith at 93 a vertical plunger 94. Slots 95 and 96 are provided in the arms 90 and 91, respectively, to receive the pivots 92 and 93, respectively, and afford the lost motion or play incident to or necessary for the operation of the parts. There is a longitudinal, horizontal passage 97 through the block 85, and also a vertical passage 98 in said block, which last-named passage extends from the top of said block down to said first-named passage. A perforated screw-cap 99 is inserted in the top of the passage 98, which passage is constructed near its lower end to form a shoulder on which is received a flange 100 on the plunger 94. The plunger 94 extends down through the screw-cap 99 into and through the passage 98, and normally projects into the passage 97. A spring 101 is interposed between the flange 100 and the screw-cap 99, and this spring normally retains the plunger 94 with its lower terminal in the passage 97 and the flange 100 on the aforesaid shoulder.

The inward movement of the plungers 18 which is provided with the tail-piece 20 causes the plungers 94 to be elevated, against the resiliency of the spring 101, through the medium of the arms 91 and 90 and the rock shaft 89, thus withdrawing said last-named plunger from the passage 97. Upon the forward movement of the tail-piece 20, the spring 101 tends to force the plunger 94 downwardly again, until the flange 100 comes to rest on the shoulder at the bottom of the enlarged part of the passage 98.

A chain, wire, or cord 102 has one terminal attached to the plunger 94, and affords means for elevating said plunger by hand. Actually the cord 102 extends to a position where it can be readily grasped and pulled by the hand of the operator.

An operating rod 103 extends through the passage 97 in the block 85, wherein said rod is slidingly arranged and through a bracket 104 secured to the outer face of the left-hand beam 1. The rod 103 is in the same horizontal plane with the tail-piece 20, and at the forward terminal said rod extends along the outer or left-hand side of said tail-piece, but does not touch the same. The forward terminal of the rod 103 is screw-threaded to receive a nut 105. The rod 103 is provided with a cone-shaped flange 106, within the passage 97, and said passage has therein a part shaped to form a seat for said flange and thereby limit the forward movement of the rod 103, inasmuch as the flange tapers from the rear inwardly (toward its axis) and forwardly. The parts and members are so constructed and arranged that, when the flange 106 is on its seat, normally the lower terminal of the plunger 94 is down behind said flange, and thus prevents the flange and the rod 103 from moving rearwardly. A cap-plate 107 is bolted or otherwise secured to the back side of the block 85 over the corresponding end of the passage 97, said plate being perforated to receive the rod 103. Mounted on and secured to the rod 103, in front of the bracket 104, is a collar 108, and a spring 109 encircles said rod between said collar and the cap-plate 107. The spring 109 thus has a constant tendency to force the rod 103 rearwardly. The short arm of the bell-crank-lever 78 has a longitudinal slot 110 therein, and a pivot 111 passes through said slot and the rear end of the rod 103, thus pivotally connecting the latter with the bell-crank-lever.

Upon the release of the conical flange 106 from the plunger 94, the spring 109 acts to force the rod 103 rearwardly, and thereby, through the medium of the short arm of the bell-crank-lever 78, to rock said bell-crank-lever, the shaft 76, and the arm 77, in the direction to open the sand boxes 35, then a resetting lever 112 is operated to move the rod 103 forwardly again.

The lever 112 is pivotally supported at 113 from a bracket 114 that is secured to the front side of the block 85. The lower terminal of the lever 112 is slotted, as at 115, to set over the rod 103 behind the nut 105, and enable said lever to be oscillated in operative position relative to said rod. A spring 116 has one terminal attached to the block 85 and the other terminal attached to the bottom of the lever 112, and normally retains said lever with its forked terminal against the front end of a loose sleeve 117 mounted on the rod 103 in front of said block. When the lever 112 is held by the spring 116 against the sleeve 117, said lever is in an approximately vertical position. The upper terminal of the lever 112 is in position to be grasped by the hand of the operator.

Upon tripping the rod 103, said rod moves rearwardly until the nut 105 contacts with the forked terminal of the lever 112. Then, upon grasping the handle of the lever 112 and rocking said lever to move its forked terminal forwardly, the rod 103 is moved in the same direction, against the resiliency of the spring 109, by the contact of the forked terminal of said lever with the nut 105. The rod 103 is thus moved forwardly until the conical flange 106 arrives at its seat. During this movement the flange 106 actuates the plunger 94 upwardly, against the resiliency of the spring 101, but, as soon as said flange is seated, said spring causes said plunger to descend behind the flange and lock the rod 103 in its forward position, with the spring 109 under tension. As soon as the lever 112 is released, the spring 116 rocks said lever in the direction to carry the lower terminal thereof back against the sleeve 117.

Any adjustment that may be required for resetting the rod 103 can be obtained by screwing the nut 105 forwardly or rearwardly on said rod.

The rod 103, when tripped by means of the cord 100, is reset in the same manner as when said rod is tripped automatically by means of the left-hand plunger 18.

More or less change in the shape, size, construction, and arrangement of some or all of the parts of this appliance may be made without departing from the spirit of my invention or exceeding the scope of what is claimed.

What I claim as my invention, and desire to secure by Letters Patent, is—

1. In a bumper of the class described, primary and secondary elements consisting in part of two pairs of members arranged side by side, with those in one pair separate from those in the other pair, and those in either pair capable of movement in both directions without moving those in the remaining pair, the construction and arrangement of said elements being such that said primary element has a certain amount of independent movement before said secondary element is actuated, after which said primary element actuates said secondary element.

2. The combination, in a bumper of the class described, with casings adapted to be attached to a chassis, of plungers slidingly arranged in said casings and provided at their outer ends with a cross-bar, springs arranged normally to retain said plungers in advanced position, other plungers slidingly arranged in said casings, each of said second-named plungers being alongside of one of said first-named plungers and separate therefrom, and said second-named plungers being provided at their outer ends with a cross-bar, and springs adapted normally to retain said second-named plungers in advanced position, the force exerted by the springs for said first-named plungers being less than that exerted by the springs for said second-named plungers.

3. The combination, in a bumper of the class described, with a brake rod, a casing carried by a chassis, and an outwardly spring-pressed plunger extending through said casing and having a projecting part, of a fixed clutch member carried by said chassis, a headed axial member supported by said clutch member, a movable clutch member mounted on said axial member, said clutch members having interengaging teeth, a spring interposed between said movable clutch member and the head of said axial member, a bar secured to said movable clutch member, and having a lug in the path of said projecting part, and a lug adapted to operate said brake rod, and yielding means normally to retain said bar with said first-named lug in operative position relative to said projecting part.

4. The combination, in a bumper of the class described, with a brake rod, a casing carried by a chassis, a headed axial member supported by said clutch member, a movable clutch member mounted on said axial member, said clutch members having interengaging teeth, a spring interposed between said movable clutch member and the head of said axial member, a bar secured to said movable clutch member, and having a lug in the path of said projecting part, and a lug adapted to operate said brake-rod, yielding means normally to retain said bar with said first-named lug in operative position relative to said projecting part, and hand-operated means to actuate said movable clutch member, against the resiliency of its spring, to disengage its teeth from the teeth of said fixed clutch member, whereby the movable clutch member is released to said yielding means for said bar.

5. The combination, in a pumper of the class described, with an engine-stopping member, a casing carried by a chassis, and an outwardly spring-pressed plunger extending through said casing and having a projecting part, of a fixed clutch member carried by said chassis, a headed axial member supported by said clutch member, a movable clutch member mounted on said axial member, said clutch members having interengaging teeth, a spring interposed between said movable clutch member and the head of said axial member, a bar secured to said movable clutch member, and having a lug in the path of said projecting part, yielding means normally to retain said bar with said lug in operative position relative to said projecting part, said bar being connected with said engine-stopping member, and hand operated means to actuate said movable clutch member, against the resiliency of its spring, to disengage its teeth from the teeth of said fixed clutch member, whereby the movable clutch member is released to said yielding means for said bar.

6. The combination, in a bumper of the class described, with engine-stopping members, casings carried by a chassis, and outwardly spring-pressed plungers extending through said casings and having projecting parts, of fixed clutch members secured to said chassis, headed axial members supported by said clutch members, movable clutch members mounted on said axial members, said fixed and movable clutch members having interengaging teeth, springs interposed between said movable clutch members and the heads of said axial members, bars secured to said movable clutch members, and having lugs in the paths of said projecting parts, yielding means normally to retain said bars with said lugs in operative position relative to said projecting parts, said bars being engaged with said engine-stopping members, and hand operated means to actuate said movable clutch members against the resiliency of their springs, to disengage their teeth from the teeth of said fixed clutch members, whereby the movable clutch members are released to said yielding means for said bars.

7. The combination, in a bumper of the class described, with brake rods, engine-stopping members, casings carried by a chassis, and outwardly spring-pressed plungers extending through said casings and having projecting parts, of fixed clutch members carried by said chassis, headed axial members supported by said clutch members, movable clutch members mounted on said axial members, said fixed and movable clutch members having interengaging teeth, springs interposed between said movable clutch members and the heads of said axial members, bars secured to said clutch members, and having lugs in the paths of said projecting parts, and lugs adapted to operate said brake rods, yielding means normally to retain said bars with said first-named lugs in operative position relative to said projecting parts, said bars being connected with said engine-stopping members, and hand operated means to actuate said movable clutch members, against the resiliency of their springs, to disengage their teeth from the teeth of said fixed clutch members, whereby the movable clutch members are released to said yielding means for said bars.

8. The combination, in a bumper of the class described, with casings carried by a chassis, and outwardly spring-pressed plungers extending through said casings and having projecting parts, of fixed clutch members carried by said chassis, headed axial members supported by said clutch members, movable clutch members mounted on said axial members, said clutch members having interengaging teeth, springs interposed between said movable clutch members and the heads of said axial members, bars secured to said movable clutch members, and having lugs in the paths of said projecting parts, yielding means normally to retain said bars with said lugs in operative position relative to said projecting parts, a suitably mounted lever, and pull members connected with opposite terminals of said lever, and each of said pull members having one terminal connected with one of said movable clutch members, and the other terminal extending beneath the chassis to a point on the other side, whereby, when either of said pull members is actuated, both movable clutch members are actuated inwardly, against the resiliency of their springs, on said pins, to disengage the clutch-member teeth, and release the movable clutch members to said yielding means for the bars.

9. The combination, in a bumper of the class described, with sand boxes located forward of the rear wheels of an automobile, and equipped with opening and closing means, of a casing carried by the chassis of said automobile, an outwardly spring-pressed plunger extending through said casing, a rock shaft carried by said chassis, said shaft being provided with projecting members, means between said members and said first-named means to open the same when said members are actuated in one direction, and means to actuate said shaft from said plunger.

10. The combination, in a bumper of the class described, with sand boxes located forward of the rear wheels of an automobile, and equipped with opening and closing means, of a casing carried by the chassis of said automobile, an outwardly spring-pressed plunger extending through said casing, a rock shaft carried by said chassis, said shaft being provided with projecting members, means between said members and said first-named means to open the latter when said members are actuated in one direction, means to actuate said shaft from said plungers, and means to operate said second-named means by hand.

11. The combination, in a bumper of the class described, with sand boxes located forward of the rear wheels of an automobile, and provided with movable closures, of a casing carried by the chassis of an automobile, an outwardly spring-pressed plunger extending through said casing, a rock shaft carried by said chassis, an arm mounted on said shaft, a member connecting one of said closures with said arm, a bell-crank-lever also mounted on said shaft, a member connecting the other of said closures with said bell-crank-lever, a block carried by said chassis, a rock shaft supported from said block and provided with arms, one of said last-named arms being pivotally connected with said plunger, an inwardly spring-pressed plunger slidingly arranged in said block and pivotally connected with the other of said last-named arms, a spring-pressed rod extending through said block and provided with a flange into the path of which said last-named plunger normally extends, said rod being pivotally connected with said bell-crank-lever.

12. The combination, in a bumper of the class described, with sand boxes located forward of the rear wheels of an automobile, and provided with movable closures, of a casing carried by the chassis of an automobile, an outwardly spring-pressed plunger extending through said casing, a rock shaft carried by said chassis, an arm mounted on said shaft, a member connecting one of said closures with said arm, a bell-crank-lever also mounted on said shaft, a member connecting the other of said closures with said bell-crank-lever, a block carried by said chassis, a rock shaft supported from said block and provided with arms, one of said last-named arms being pivotally connected with said plunger, an inwardly spring-pressed plunger slidingly arranged in said block and pivotally connected with the other of said last-named arms, and a spring-pressed rod extending through said block and provided with a conical flange into the path of which said last-named plunger normally extends, said rod being pivotally connected with said bell-crank-lever.

13. The combination, in a bumper of the class described, with a casing carried by the chassis of an automobile, an outwardly spring-pressed plunger in said casing, and sand boxes located forward of the rear wheels of said automobile, and provided with closures, of a rock shaft supported by said chassis, an arm mounted on said shaft, a member connecting one of said closures with said arm, a bell-crank-lever also mounted on said shaft, a member connecting the other of said closures with said bell-crank-lever, a spring-pressed rod supported from said chassis and connected with said bell-crank-lever, means to hold said rod with its spring under tension, and tripping means for said rod, which means is capable of being operated either by said plunger or by hand.

14. The combination, in a bumper of the class described, with sand boxes located forward of the rear wheels of an automobile, and provided with closures, of a casing carried by the chassis of said automobile, an outwardly spring-pressed plunger in said casing, a rock shaft supported by said chassis, an arm mounted on said shaft, a member connecting one of said closures with said arm, a bell-crank-lever mounted on said shaft, a member connecting the other of said closures with said bell-crank-lever, a block carried by said chassis, a rock shaft supported from said block and provided with arms, one of said last-named arms being pivotally connected with said plunger, a spring-pressed plunger in said block and pivotally connected with the other of said last-named arms, a spring-pressed rod extending through said block and provided with a flange into the path of which said last-named plunger normally extends, said rod being pivotally connected with said bell-crank-lever, and hand-operated resetting means for said rod.

15. The combination, in a bumper of the class described, with a casing carried by the chasis of an automobile, an outwardly spring-pressed plunger in said casing, and sand boxes located forward of the rear wheels of said automobile, and provided with closures, of a rock shaft supported by said casing, an arm mounted on said shaft, a member connecting one of said closures with said arm, a bell-crank-lever also mounted on said shaft, a member connecting the other of said closures with said bell-crank-lever, a spring-pressed plunger in said block and pivotally connected with the other of said last-named arms, a spring-pressed rod extending through said block and provided with a flange into the path of which said last-named plunger normally extends, said rod being pivotally connected with said bell-crank-lever, a projecting member on said rod, and a resetting lever pivotally supported from said block, and having a part to engage said projecting member and actuate said rod against the resiliency of its spring.

GAETANO NIGRO.